(12) United States Patent
Bejerano et al.

(10) Patent No.: US 7,430,189 B2
(45) Date of Patent: Sep. 30, 2008

(54) METHODS AND DEVICES FOR DETERMINING THE ADJACENCY OF ACCESS POINTS IN A WIRELESS NETWORK

(75) Inventors: Yigal Bejerano, Springfield, NJ (US); S. Jamaloddin Golestani, New Providence, NJ (US); Seung-Jae Han, Basking Ridge, NJ (US); Mark Anthony Shawn Smith, Jersey City, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 467 days.

(21) Appl. No.: 11/026,905

(22) Filed: Dec. 31, 2004

(65) Prior Publication Data
US 2006/0146754 A1    Jul. 6, 2006

(51) Int. Cl.
*H04Q 7/00* (2006.01)
*H04Q 7/24* (2006.01)
*H04Q 7/20* (2006.01)

(52) U.S. Cl. .................... 370/332; 370/338; 455/450

(58) Field of Classification Search ............... 370/332, 370/338; 455/450
See application file for complete search history.

(56) References Cited

U.S. PATENT DOCUMENTS

| 6,636,737 | B1 | 10/2003 | Hills et al. | 455/450 |
|---|---|---|---|---|
| 6,711,148 | B1 * | 3/2004 | Hills | 370/338 |
| 2005/0003827 | A1 * | 1/2005 | Whelan | 455/454 |
| 2006/0146768 | A1 | 7/2006 | Bejerano et al. | 370/338 |
| 2006/0182023 | A1 | 8/2006 | Bejerano et al. | 370/229 |

FOREIGN PATENT DOCUMENTS

| EP | 1 063 819 A | 12/2000 |
|---|---|---|
| EP | 1 081 972 | 3/2001 |

OTHER PUBLICATIONS

European Search Report dated Mar. 16, 2006.

* cited by examiner

*Primary Examiner*—Barry W Taylor

(57) ABSTRACT

The adjacency of access points in a wireless, local area network is used to determine the existence of common overlapping access point coverage areas and to determine maximum distances between access points.

33 Claims, 3 Drawing Sheets

METHODS AND DEVICES FOR DETERMINING THE ADJACENCY OF ACCESS POINTS IN A WIRELESS NETWORK

BACKGROUND OF THE INVENTION

A wireless local area network (WLAN) is typically made up of a number of "access points" (APs). Each access point is responsible for transmitting information to a plurality of mobile devices (e.g., wireless laptop computer, etc.) that are within the transmission range of the AP. The area within which a mobile device can effectively receive a wireless transmission from an AP is called the coverage area of an AP.

Many times, the coverage areas of one or more APs overlap. When this occurs, a mobile device may be able to receive a transmission from one or more APs. Though a mobile device may be able to receive a transmission from more than one AP, the signal strength of each transmission may not be the same. More particularly, a transmission a mobile device receives from one AP may have a high signal-to-noise ratio (SNR) while the transmission the mobile device receives from another AP may have a low SNR. Of course, there may be occasions when the SNRs are the same, indicating that the mobile device can receive a transmission from either AP at the same signal strength.

Depending on the received SNR, as well as other factors, a mobile device will decide which AP or APs to communicate with. Knowledge of the coverage areas of APs aids in this decision-making process. It is, therefore, desirable to be able to determine the extent to which coverage areas of APs overlap or share common coverage points.

Along with coverage areas, it is also desirable to determine how far apart one AP is from another in order to, for example, identify holes in the overall coverage area of a WLAN.

SUMMARY OF THE INVENTION

The present inventors have recognized that the coverage areas of APs and the distances between APs may be determined by identifying those APs which are adjacent to one another.

In accordance with one aspect of the present invention, common, transmission coverage points (e.g., overlapping coverage areas) for APs may be determined by a controller, or the like, which is operable to receive one or more signal quality indicators from a mobile device, where each indicator is associated with a wireless transmission between an access point in a WLAN and a mobile device. After receiving the signal quality indicators, the controller may be operable to estimate an edge weight value associated with each pair of adjacent access points in the WLAN. The so-estimated edge weight values provide a relative indication of the common, transmission coverage points of each pair of adjacent access points in the WLAN.

In accordance with another aspect of the present invention, maximum distances between APs in a WLAN may be determined by using signal quality indicators which represent received power levels measured between a mobile device and a pair of access points. These signal quality indicators are subsequently used to estimate edge weight values, where each edge weight value provides a relative indication of the maximum distance between any pair of adjacent access points.

Both aspects of the present invention, namely the determination of common, transmission coverage points and the determination of maximum distances between access points, may also rely on an access point adjacency graph (APAG).

APAGs include an indication of those access points which are adjacent to one another, where such adjacency is derived from received signal quality indicators.

DESCRIPTION OF THE INVENTION, INCLUDING EXAMPLES

Figure 1A:
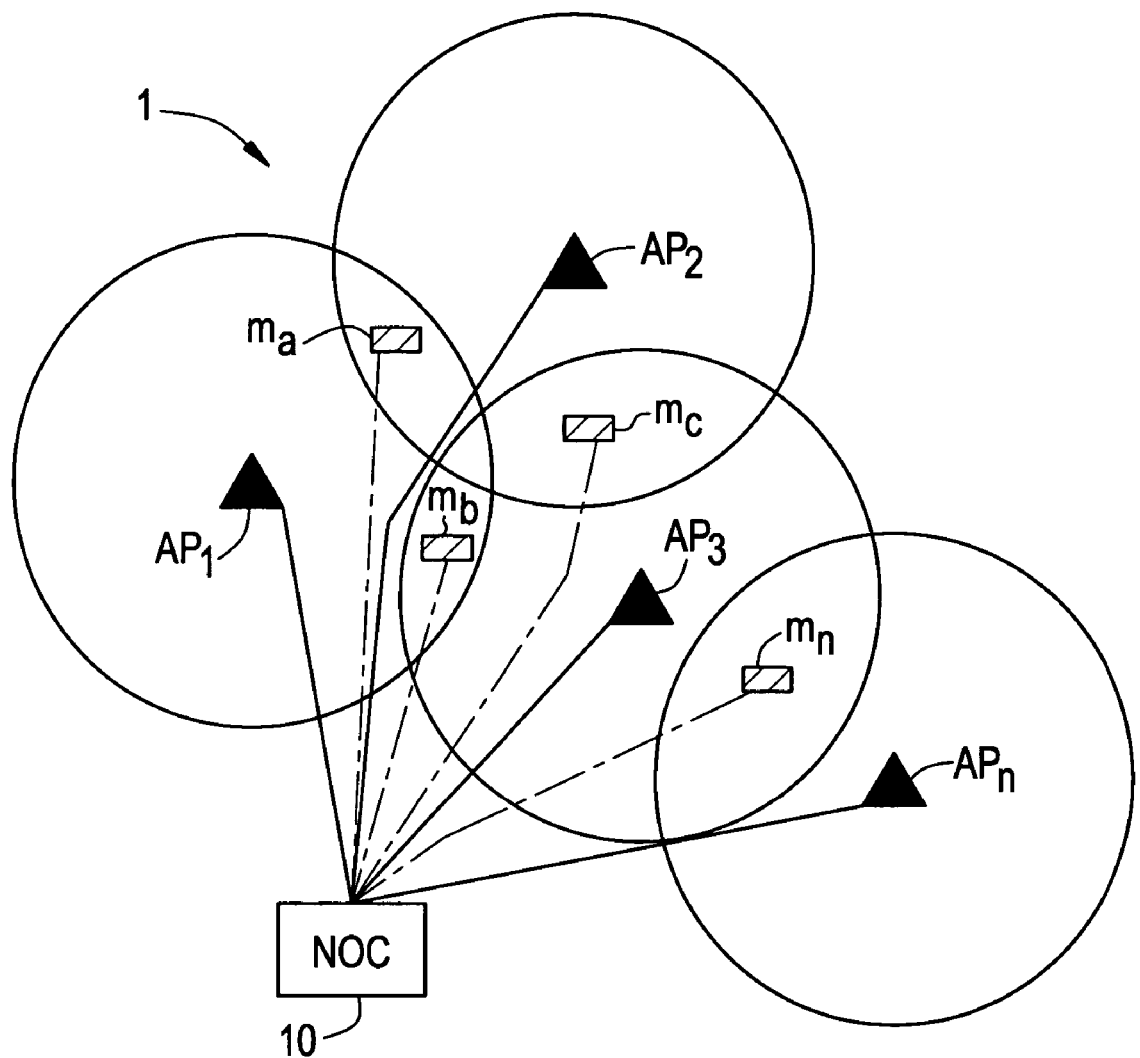
FIG. 1A depicts a simplified, wireless, local area network (WLAN) according to an embodiment of the present invention.

Referring now to FIG. 1A, there is depicted a wireless network 1, such as a WLAN, which comprises one or more APs, labeled $AP_1$, $AP_2$, $AP_3$, ... $AP_n$ (where n indicates the last AP in the wireless network). Each of the access points, $AP_1$, $AP_2$, $AP_3$, ... $AP_n$ has an associated coverage area indicated as $a_1, a_2, a_3, \ldots a_n$. The coverage area of each access point represents the area within which a wireless transmission from an access point $AP_1, AP_2, AP_3, \ldots AP_n$ can effectively be received by a mobile device $m_a$, $m_b$, $m_c$, $m_d$.

As indicated in FIG. 1A, at some point in time, each of these mobile devices $m_a$, $m_b$, $m_c$, $m_d$ is located within one or more of the coverage areas $a_1$ through $a_4$ of one or more of the mobile devices $AP_1$, $AP_2$, $AP_3$, ... $AP_n$.

In accordance with the present invention, the inventors have discovered methods and devices for determining common, transmission coverage points for each of the access points $AP_1, AP_2, AP_3, \ldots AP_n$ in the network 1.

It should be noted that the terminology "common transmission coverage points" may indicate that two or more access points have only a single point, or a wide area, in common. In the former case, this may mean that there may be only a single location where a mobile device may be able to receive a transmission from two APs. This situation is illustrated by WLAN 11 and points $p_{13}$ through $p_{n3}$ in FIG. 1B.

Figure 1B:
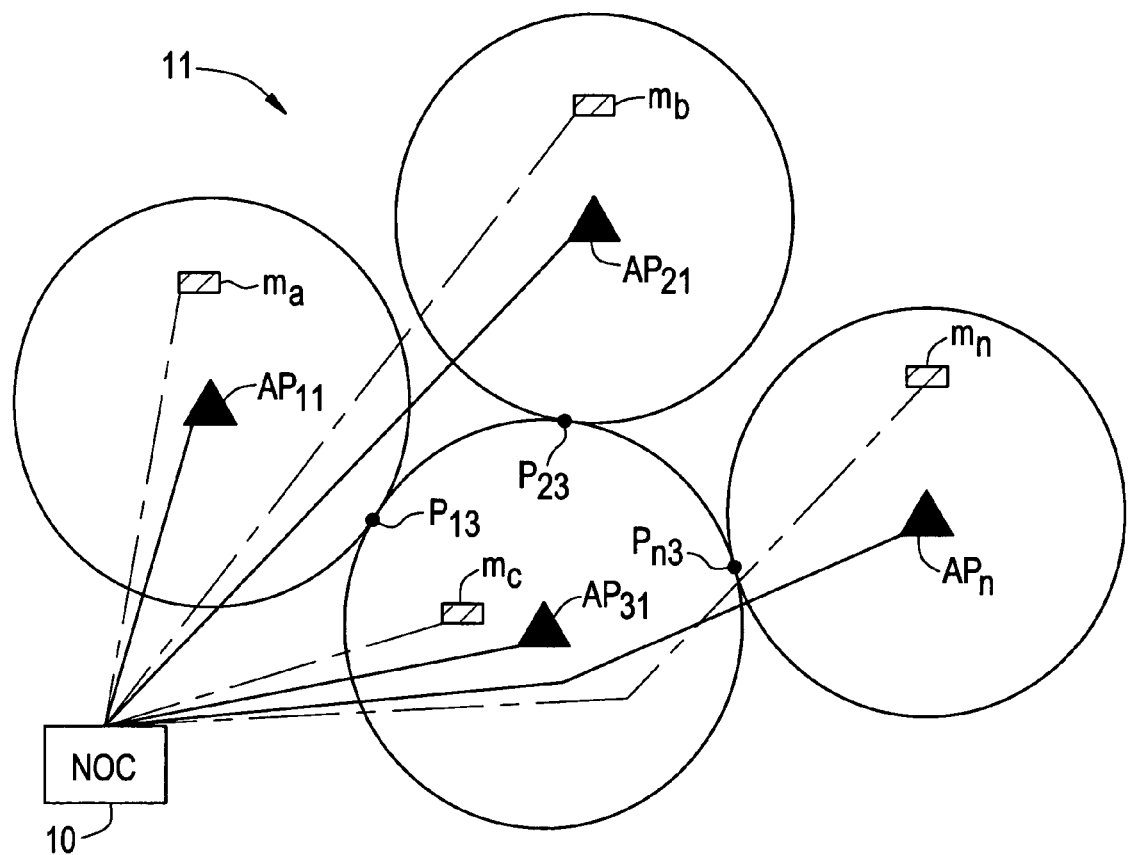
FIG. 1B depicts another WLAN according to another embodiment of the present invention.

Also shown in FIGS. 1A and 1B is a network controller, sometimes referred to as a network operations center (NOC) 10. As indicated, each of the APs is connected (either wirelessly or wired) to the NOC 10. It should also be understood that each of the mobile devices $m_a$-$m_d$ is also capable of communicating with the controller 10.

In one embodiment of the present invention, the controller 10 is operable to determine common, transmission coverage points for each of the access points $AP_1$ through $AP_n$ of network 1. To simplify the explanation of the present invention, the discussion which follows will first focus on application of the present invention to a single mobile device $m_a$ and two access points, $AP_1$ and $AP_2$, it being understood that the present invention is equally applicable to a plurality of mobile devices and access points.

In one embodiment of the present invention, the controller 10 is operable to receive one or more signal quality indicators from at least one mobile device, such as mobile device $m_a$. Each indicator is associated with a wireless transmission between an access point, such as $AP_1$ or $AP_2$, and a mobile device $m_a$.

Figure 2:
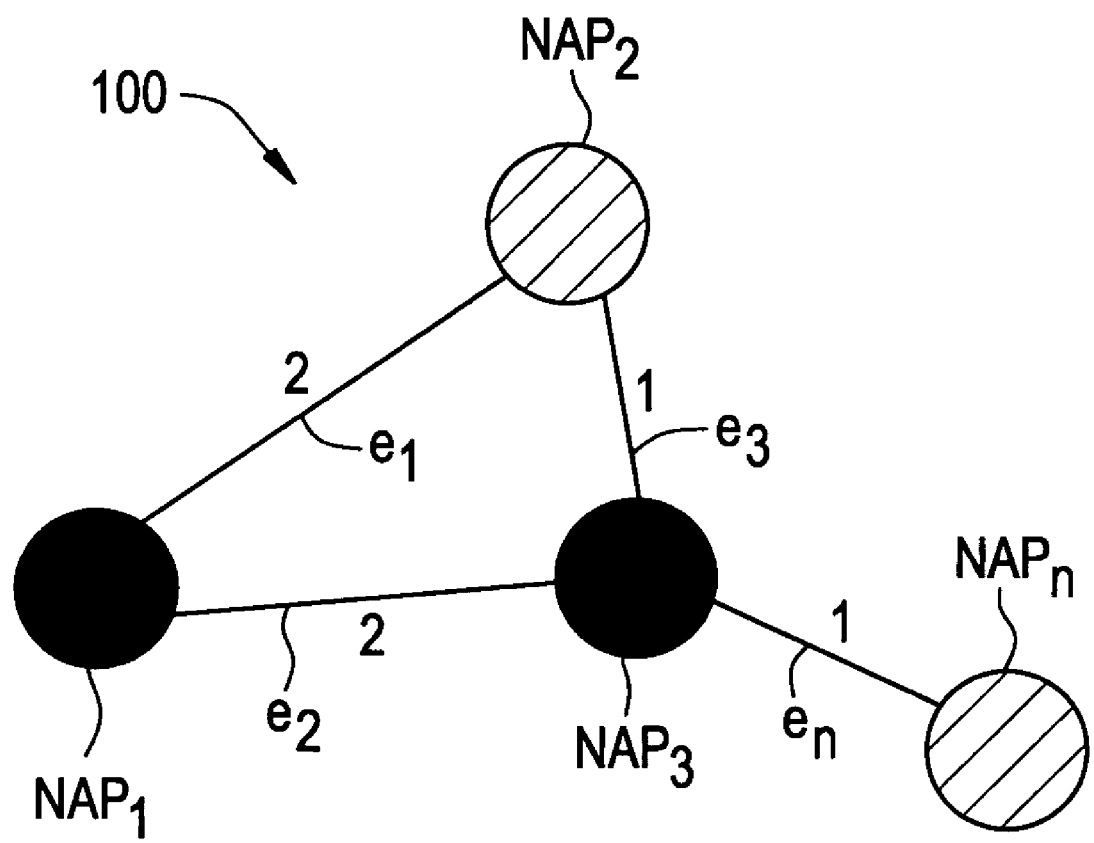
FIG. 2 depicts a simplified, access point adjacency graph (APAG) derived from the WLAN in FIG. 1A according to one embodiment of the present invention.

Upon receiving the indicators, the controller 10 is further operable to determine the common, transmission coverage points (e.g., coverage area) of access points $AP_1$ and $AP_2$. In one embodiment of the present invention, the controller 10 is operable to use the received indicators to generate an APAG, such as the one shown in FIG. 2.

As shown, APAG 100 includes nodal access points (NAP) labeled $NAP_1$ through $NAP_n$. It should be understood that each of the nodal access points represents one of the APs, $AP_1$ through $AP_n$ shown in FIG. 1A. Thus, an APAG is comprised of a number of nodal access points that are connected by so-called "edges" ($e_1$ through $e_n$). In one embodiment of the present invention, the controller 10 is further operable to form the edges $e_1$ through $e_n$ shown in FIG. 2 using the received signal quality indicators.

For example, mobile device $m_a$ may receive separate transmissions from access point $AP_1$ and access point $AP_2$. Mobile device $m_a$ is operable to measure the SNR for each of these transmissions. Thereafter, mobile device $m_a$ is further operable to transmit a signal quality indicator which indicates the relative SNR of a transmission. For example, it may transmit a high signal quality indicator indicating the transmission received from $AP_1$ is very strong and a low signal quality indicator indicating that the transmission received from $AP_2$ is very weak. However, when the transmissions received from $AP_1$ and $AP_2$ are both relatively strong (e.g., when both transmissions exceed some threshold) then the signal quality indicators would both be relatively high.

Upon receiving the signal quality indicators, the controller 10 is operable to compare the received signal quality indicators to a stored, signal quality indicator threshold. When each of the received signal quality indicators exceeds this stored threshold, then the controller 10 is operable to form an edge $e_1$ between an $AP_1$ and an $AP_2$ in APAG 100. Similarly, the controller 10 may be operable to form other edges $e_2$ through $e_n$ between other access points $AP_2$ through $AP_n$ as shown in FIG. 1A provided transmissions received by a mobile device $m_a$ through $m_n$ from two or more access points, $AP_1$ through $AP_n$ exceed a signal quality indicator threshold.

After the edges $e_1$ through $e_n$ have been added, the present invention further provides for assigning weights (e.g., values) to each of the edges $e_1$ through $e_n$. For example, edge $e_1$ has been assigned a weight of "2" in FIG. 2. This weight is a relative indication of the common, transmission coverage points of access points $AP_1$ and $AP_2$. For example, the greater the value the greater the overlap between $AP_1$ and $AP_2$ coverage areas.

The assignment of these weights may be carried out as follows.

In yet a further embodiment of the present invention, upon receiving signal quality indicators the controller 10 is operable to assign a potential, transmission bit rate to each received indicator.

In a further embodiment of the present invention, because each of the signal quality indicators is, for example, an indication of the SNR of a transmission between a mobile device $m_a$ through $m_n$ and one of the access points $AP_1$ through $AP_n$ the assignment of a transmission bit rate to each received indicator can be viewed as the assignment of a bit rate to a specific SNR. Table 1 below provides an example of an assignment scheme which may be used by controller 10.

TABLE 1

| | SNR (DB) | | | |
|---|---|---|---|---|
| | 1-4 | 4-8 | 8-13 | 13+ |
| Bit Rate | 1 | 2 | 5.5 | 11 |

Continuing, provided the controller has determined that an edge exists between two APs as discussed previously above, and after the controller 10 has assigned a bit rate to each of the measured SNRs (i.e., associated signal quality indicators), the controller 10 may select a pair of assigned bit rates, where the bit rates are associated with a pair of access pointes, such as $AP_1$ and $AP_2$. The controller 10 may then be operable to compare these bit rates to a weight chart, such as the one shown in Table 2 below. The value of both bit rates determines the weight. For example, the higher the bit rates, the greater the weight. Each weight in Table 2 represents an edge weight value.

TABLE 2

| | $AP_1$ Bit Rate | | | | |
|---|---|---|---|---|---|
| $AP_2$ Bit Rate | 1 | 2 | 5.5 | 11 | |
| 1 | 0.05 | 0.1 | 0.15 | 0.20 | Weights |
| 2 | 0.1 | 0.2 | 0.25 | 0.3 | |
| 5.5 | 0.15 | 0.25 | 0.3 | 0.5 | |
| 11 | 0.2 | 0.3 | 0.5 | 0.75 | |

Up until now the discussion above has focused on a single mobile device, $m_a$. However, the present invention is applicable to a plurality of mobile devices $m_a$ through $m_n$.

Accordingly, in accordance with a n additional embodiment of the present invention, the controller 10 may be further operable to receive a plurality of signal quality indicators from a plurality of mobile devices, $m_a$ through $m_n$, where each indicator is associated with a wireless transmission between one access point $AP_1$ through $AP_n$ and one of the mobile devices. Thereafter, the controller 10 may be further operable to identify a set of signal quality indicators from the plurality of received indicators, such that each indicator in the identified set has a value that is among a top 5% of all signal quality indicator values.

By so identifying such a set, the present invention makes use of the probability that the strongest signals (e.g., greater SNRs) correspond to the highest signal quality indicators. In addition, in all probability the strongest signals are also related to the truest signals (i.e., signals that are more indicative of the true overlapping coverage area).

After identifying the set of signal quality indicators, the controller 10 may be further operable to average the values contained in the identified set to estimate a plurality of edge weight values that can be assigned to edges between access points within an adjacency graph. It is these estimated edge weight values that provide a relative indication of the common, transmission coverage points of overlapping APs within WLAN 1.

It should be understood that the estimated edge weight values not only provide a relative indication of the common, transmission coverage or overlapping points of APs, but they also provide an indication of coverage holes. That is, if it is determined that there is a section of a WLAN where there is little, if any, overlapping of coverage areas, then this information may be important for a network operator. In some cases, the network operator may choose to install an additional access point or otherwise reconfigure the location of existing access points to provide additional coverage in locations which are presently receiving little or no coverage.

In general, it can be said that when signal quality indicators associated with two access points exceed a threshold, the access points can be said to be "adjacent". Up until now the discussion above has used the adjacency of access points to determine common, transmission coverage points (e.g., overlapping coverage areas) of two or more access points. The present inventors realized, however, that adjacency may also be used for other purposes. For example, adjacency can be used to determine the relative indication of a maximum distance between two access points as described in more detail below.

Referring back to FIG. 1A, again beginning our discussion focusing on a single mobile device, $m_a$, one skilled in the art will realize that mobile device $m_a$ can measure a received power level from access point $AP_1$ and a received power level from access point $AP_2$. Ordinarily, the power levels received by mobile device $m_a$ will be less than the power levels originally transmitted by access points $AP_1$ or $AP_2$. Upon measuring the received power levels associated with a wireless transmission between each of the access points $AP_1$ and $AP_2$, the mobile device $m_a$ may be operable to forward the measured, received power levels to the controller 10. More specifically, the received power levels may be converted to a signal quality indicator and the signal quality indicators may be forwarded on to the controller 10.

Upon receiving one or more of the signal quality indicators from the mobile device $m_a$, the controller 10 may be further operable to estimate an edge weight value associated with access point $AP_1$ and access point $AP_2$ based on the received indicators. The so-estimated edge weight value may represent a relative indication of a maximum distance between $AP_1$ and $AP_2$.

In more detail, similar to the discussion above, upon receiving the signal quality indicators, the controller 10 may be operable to identify a set of signal quality indicators from the plurality of received signal quality indicators, such that each indicator in the set has a value that is among the top 5% of all of the received signal quality indicators. Thereafter, the controller 10 may be further operable to average the values of the identified set of indicators to estimate a plurality of edge weight values.

The controller 10 may be operable to generate an adjacency graph (not shown) wherein each access point, such as access points $AP_1$ and $AP_2$, may be connected by an edge and assigned an edge weight using the estimated, edge weight values.

In a further embodiment of the present invention, each of the estimated and assigned edge weight values represents a maximum distance between access points in WLAN 1. More particularly, if the signal quality indicators associated with $AP_1$ and $AP_2$ fall within this set, then an edge would be created between access points $AP_1$ and $AP_2$ and this edge would be assigned a value which represents a maximum distance between $AP_1$ and $AP_2$.

In this way, the adjacency graph may be used to provide relative indications of maximum distances between all of the access points in WLAN 1.

In yet a further embodiment of the present invention, the APAGs used to determine the maximum distances between access points may also be used to generate maps which represent the actual physical location of APs. That is, because the present invention provides for the relative indication of maximum distances between access points, these distances may be used to generate a physical map of a WLAN.

As noted above, the controller 10 is operable to carry out a number of functions. These functions may be carried out within the controller using a combination of programmable hardware, software, firmware, or some combination of the three. In the case of software or firmware, the controller 10 may comprise one or more memory sections for storing one or more programs for carrying out the features and functions of the present invention.

In general, the methods and devices provided by the present invention may be applied to determine the adjacency of access points in a WLAN. The discussion above has focused on the use of an adjacency graph to provide a relative indication of the common coverage areas or maximum distances between two or more access points. It should be understood that adjacency may be utilized to perform other functions as well, such as access point load balancing and mobile device-to-access point associations as disclosed, for example, in co-pending U.S. patent application Ser. Nos. 11/026,904 and 11/057,769, the disclosures of which are incorporated herein as if set forth in full herein, using signal quality indicators and adjacency graphs.

Yet other relationships between access points may be realized by studying the adjacency, or lack thereof, of access points in a WLAN in accordance with the principles of the present invention. It should be understood that the discussion above only provides a few examples of the present invention, the true scope of which is covered by the claims which follow.

I claim:

1. A method for determining common, transmission coverage points for access points (APs) in a wireless, local area network (WLAN) comprising the steps of:
   receiving one or more signal quality indicators from at least one mobile device, each indicator associated with a wireless transmission between an access point (AP) in the WLAN and the mobile device; and
   estimating an edge weight value associated with two adjacent APs in the WLAN based on the received indicators, wherein the edge weight value is a relative indication of common, transmission coverage points of the two adjacent APs.

2. The method as in claim 1 wherein the common, transmission coverage points form an area where wireless transmissions from the two APs overlap.

3. The method as in claim 1 further comprising the step of generating an adjacency graph representing transmission coverage points of the two APs.

4. The method as in claim 3 wherein the step of generating an adjacency graph comprises the step of forming an edge between the two APs when signal quality indicators associated with the APs exceed a threshold.

5. The method as in claim 4 further comprising the steps of:
   assigning a transmission bit rate to each received indicator of each AP connected by the formed edge; and
   estimating the edge weight value based on the pair of assigned bit rates.

6. The method as in claim 5 further comprising the step of associating the pair of assigned bit rates to an edge weight value.

7. The method as in claim 1 wherein each signal quality indicator is an indication of a signal-to-noise ratio of a wireless transmission between the mobile device and an AP.

8. The method as in claim 1 further comprising the steps of:
   receiving a plurality of signal quality indicators from a plurality of mobile devices, each indicator associated with a wireless transmission between one AP in the WLAN and one of the mobile devices;
   identifying a set of signal quality indicators from the plurality of received indicators, wherein each indicator in the set has a value that is among a top 5% of all signal quality indicator values; and
   averaging the values of the identified set of indicators to estimate a plurality of edge weight values.

9. The method as in claim 1 further comprising the steps of:
   receiving a plurality of signal quality indicators, each indicator associated with a wireless transmission between an AP in the WLAN and the mobile device;

identifying a set of signal quality indicators from the plurality of received indicators, wherein each indicator in the set has a value that is among a top 5% of all signal quality indicator values; and averaging the values of the identified set of indicators to estimate a plurality of edge weight values.

10. The method as in claim 1 further comprising determining whether two APs in the WLAN are adjacent based on the signal quality indicators.

11. The method as in claim 10 further comprising the steps of:

generating an adjacency graph; and representing adjacencies of APs within the WLAN based on at least the signal quality indicators.

12. The method as in claim 11 wherein the step of generating an adjacency graph comprises the step of forming an edge between two APs when signal quality indicators associated with the two APs exceed a threshold, wherein the edge indicates the two APs are adjacent.

13. A method for determining distances between access points (APs) in a wireless, local area network (WLAN) comprising the steps of:

receiving one or more signal quality indicators from at least one mobile device, each indicator associated with a wireless transmission between an AP in the WLAN and the mobile device; and estimating an edge weight value associated with two adjacent APs in the WLAN based on the received indicators, wherein the edge weight value is a relative indication of a maximum distance between the two adjacent APs.

14. The method as in claim 13 wherein each signal quality indicator is an indication of a measured, received power level between the mobile device and an AP.

15. The method as in claim 14 further comprising the steps of:

receiving a transmit power level from two or more APs; and estimating the edge weight value based on the transmit power levels and power levels measured between the mobile device and the two APs.

16. The method as in claim 13 further comprising the step of generating an adjacency graph representing maximum distances between APs in the WLAN.

17. A device for determining common, transmission coverage points for access points (APs) in a wireless, local area network (WLAN), operable to:

receive one or more signal quality indicators from at least one mobile device, each indicator associated with a wireless transmission between an access point (AP) in the WLAN and the mobile device; and estimate an edge weight value associated with two adjacent APs in the WLAN based on the received indicators, wherein the edge weight value is a relative indication of common, transmission coverage points of the two adjacent APs.

18. The device as in claim 17 wherein the common, transmission coverage points form an area where wireless transmissions from the two APs overlap.

19. The device as in claim 17 further operable to generate an adjacency graph representing transmission coverage points of the two APs.

20. The device as in claim 19 further operable to form an edge between the two APs in the adjacency graph when signal quality indicators associated with the APs exceed a threshold.

21. The device as in claim 20 further operable to:

assign a transmission bit rate to each received indicator of each AP connected by the formed edge; and estimate the edge weight value based on the pair of assigned bit rates.

22. The device as in claim 21 further operable to associate the pair of assigned bit rates to an edge weight value.

23. The device as in claim 17 wherein each signal quality indicator is an indication of a signal-to-noise ratio of a wireless transmission between the mobile device and an AP.

24. The device as in claim 17 further operable to:

receive a plurality of signal quality indicators from a plurality of mobile devices, each indicator associated with a wireless transmission between one AP in the WLAN and one of the mobile devices;

identify a set of signal quality indicators from the plurality of received indicators, wherein each indicator in the set has a value that is among a top 5% of all signal quality indicator values; and average the values of the identified set of indicators to estimate a plurality of edge weight values.

25. The device as in claim 17 wherein the device comprises a controller.

26. The device as in claim 17 further operable to determine whether two APs in the WLAN are adjacent based on the signal quality indicators.

27. The device as in claim 26 further operable to:

generate an adjacency graph; and represent adjacencies of APs within the WLAN based on at least the signal quality indicators.

28. The device as in claim 26 further operable to form an edge between two APs in the adjacency graph when signal quality indicators associated with the two APs exceed a threshold, wherein the edge indicates the two APs are adjacent.

29. A device, for determining distances between access points (APs) in a wireless, local area network (WLAN), operable to:

receive one or more signal quality indicators from at least one mobile device, each indicator associated with a wireless transmission between an AP in the WLAN and the mobile device; and estimate an edge weight value associated with two adjacent APs in the WLAN based on the received indicators, wherein the edge weight value is a relative indication of a maximum distance between the two adjacent APs.

30. The device as in claim 29 wherein each signal quality indicator is an indication of a measured, received power level between the mobile device and an AP.

31. The device as in claim 30 further operable to:

receive a transmit power level from two or more APs; and estimate the edge weight value based on the transmit power levels and power levels measured between the mobile device and the two APs.

32. The device as in claim 29 further operable to:

receive a plurality of signal quality indicators, each indicator associated with a wireless transmission between an AP in the WLAN and the mobile device;

identify a set of signal quality indicators from the plurality of received indicators, wherein each indicator in the set has a value that is among a top 5% of all signal quality indicator values; and average the values of the identified set of indicators to estimate a plurality of edge weight values.

33. The device as in claim 29 further operable to generate an adjacency graph representing maximum distances between APs in the WLAN.

* * * * *